US011467645B2

(12) United States Patent
Liang et al.

(10) Patent No.: US 11,467,645 B2
(45) Date of Patent: Oct. 11, 2022

(54) STORAGE DEVICE AND METHOD FOR SUDDEN POWER OFF RECOVERY THEREOF

(71) Applicant: RayMX Microelectronics Corp., Hefei (CN)

(72) Inventors: Zhi Fan Liang, Lu'an (CN); Hui Wang, Changzhou (CN)

(73) Assignee: RAYMX MICROELECTRONICS CORP., Hefei (CN)

( * ) Notice: Subject to any disclaimer, the term of this patent is extended or adjusted under 35 U.S.C. 154(b) by 133 days.

(21) Appl. No.: 17/156,711

(22) Filed: Jan. 25, 2021

(65) Prior Publication Data
US 2022/0066527 A1    Mar. 3, 2022

(30) Foreign Application Priority Data

Sep. 3, 2020   (CN) .......................... 202010915047.6

(51) Int. Cl.
| | |
|---|---|
| *G06F 1/30* | (2006.01) |
| *G06F 16/172* | (2019.01) |
| *G06F 16/11* | (2019.01) |
| *G06F 12/02* | (2006.01) |

(52) U.S. Cl.
CPC ............ *G06F 1/30* (2013.01); *G06F 12/0253* (2013.01); *G06F 16/128* (2019.01); *G06F 16/172* (2019.01)

(58) Field of Classification Search
CPC ........ G06F 1/30; G06F 16/172; G06F 16/128; G06F 12/0253
See application file for complete search history.

(56) References Cited

U.S. PATENT DOCUMENTS

| | | | |
|---|---|---|---|
| 9,904,480 B1 * | 2/2018 | Singh | .................... G06F 3/0641 |
| 2020/0133841 A1 * | 4/2020 | Davis | ................. G06F 12/0253 |
| 2020/0363960 A1 * | 11/2020 | Valaguru | ................. G06F 3/064 |

\* cited by examiner

*Primary Examiner* — Henry Tsai
*Assistant Examiner* — John B Roche
(74) *Attorney, Agent, or Firm* — McClure, Qualey & Rodack, LLP

(57) ABSTRACT

Disclosed are a storage device and a method for sudden power off recovery thereof. The method includes: performing a first snapshot operation on the storage device to obtain system information, and storing the system information and a first tag into a non-volatile memory when the storage device in an idle state; performing a second snapshot operation on the storage device to obtain system information of the storage device, and storing the system information and a second tag into the non-volatile memory when at least one of the following conditions occurring: updating a logical-to-physical mapping table in the non-volatile memory, executing a garbage collection operation, and programming a new block; searching the latest system information in the non-volatile memory when recovering supply of power; when determining that the searched system information includes the first tag, performing a lightweight sudden power off recovery operation in the storage device.

18 Claims, 4 Drawing Sheets

STORAGE DEVICE AND METHOD FOR SUDDEN POWER OFF RECOVERY THEREOF

CROSS REFERENCE TO RELATED APPLICATION

This application claims the priority benefit of Chinese Patent Application Serial Number 202010915047.6, filed on Sep. 3, 2020, the full disclosure of which is incorporated herein by reference.

BACKGROUND

Technical Field

The present invention relates to the technical field of sudden power off recovery, and particularly relates to a storage device and a method for suddenly power off thereof.

Related Art

During the operation of a common storage device, such as a solid-state drive (SSD) and a flash disk, the storage device may be powered off abnormally since the user forcibly shuts down the host or a sudden power failure occurs. The static random access memory (SRAM) and the dynamic random access memory (DRAM) in the storage device are volatile memories, which have the characteristic of losing information immediately after the power failure or power off, so that there is a problem that the data stored in the volatile memory in the storage device cannot be restored to the previous working state when it is powered on again.

In view of this, the related industry proposes a sudden power off recovery (SPOR) operation, which is performed after an abnormal power failure occurs in the normal operation of the storage device, to ensure that the data of the storage device and the logical-to-physical mapping table for maintaining the data cannot be lost or wrong, to restore to the state before the power failure when the power is turned on again after the abnormal power failure occurs. However, during the formal SPOR operation, the storage device needs to parse the logical-to-physical mapping table in the non-volatile memory and scan all data areas in the non-volatile memory, so it takes a long time, which affects the user experience, even to the extent that performing the formal SPOR operation takes too long to make the recognition failure of the storage device occur.

SUMMARY

The embodiments of the present invention provide a storage device and a method for suddenly power off thereof to solve the problems that the formal SPOR operation takes a long time, which affects the user experience, and may even cause the recognition failure of the storage device.

In order to solve the above technical problems, the present invention is implemented as follows:

According to a first aspect, an embodiment of the present invention provides a method for sudden power off recovery of a storage device, wherein the storage device includes a volatile memory, a non-volatile memory, and a controller. The method for sudden power off recovery of the storage device is executed by the controller. The method for sudden power off recovery of the storage device includes the steps of: performing a first snapshot operation on the storage device to obtain system information of the storage device, and storing the system information and a first tag into the non-volatile memory when the storage device in an idle state; performing a second snapshot operation on the storage device to obtain system information of the storage device, and storing the system information and a second tag into the non-volatile memory when at least one of the following conditions occurring: updating a logical-to-physical mapping table in the non-volatile memory, executing a garbage collection operation, and programming a new block; searching the latest system information stored in the non-volatile memory, and determining whether the searched system information comprises the first tag when recovering supply of power after a power failure; performing a lightweight sudden power off recovery (SPOR) operation in the storage device when determining that the searched system information comprises the first tag; and performing a formal sudden power off recovery (SPOR) operation in the storage device when determining that the searched system information comprises the second tag; wherein a complexity of the lightweight SPOR operation is simpler than that of the formal SPOR operation; wherein the first tag and the second tag are different.

According to a second aspect, an embodiment of the present invention provides a storage device, wherein the storage device includes a volatile memory, a non-volatile memory, and a controller. The volatile memory and the non-volatile memory are respectively connected to the controller. The controller includes a processor, wherein the processor is configured to execute a program code for a method for sudden power off recovery of the storage device to: perform a first snapshot operation on the storage device to obtain system information of the storage device, and write the system information and a first tag to the non-volatile memory when the storage device in an idle state; perform a second snapshot operation on the storage device to obtain system information of the storage device, and write the system information and a second tag to the non-volatile memory when it is determined that at least one of the following conditions occurs: a logical-to-physical mapping table is updated in the non-volatile memory, a garbage collection operation is executed, and a new block is programmed; search the latest system information written in the non-volatile memory, and determine whether the searched system information comprises the first tag when supply of power is recovered after a power failure; perform a lightweight sudden power off recovery (SPOR) operation in the storage device when the searched system information comprises the first tag; and perform a formal sudden power off recovery (SPOR) operation in the storage device when the searched system information comprises the second tag; wherein a complexity of the lightweight SPOR operation is simpler than that of the formal SPOR operation; wherein the first tag and the second tag are different.

In the embodiments of the present invention, the first snapshot operation is performed on the storage device to obtain the system information when the storage device is in the idle state, and then the system information and the first tag is written in the non-volatile memory, so that when the storage device is in the idle state and is powered on again after the power failure, if the latest system information searched includes the first tag, the lightweight SPOR, which is simpler than the formal SPOR, is performed to restore the volatile memory to the state before the power failure. Since there is no need to parse the logic-to-physical mapping table in the non-volatile memory, nor scan the data information of all blocks in the non-volatile memory, the time required for recovering from the power failure can be greatly shortened when the storage device is in the idle state and is powered on again after the power failure.

It should be understood, however, that this summary might not contain all aspects and embodiments of the present invention, that this summary is not meant to be limiting or restrictive in any manner, and that the invention as disclosed herein will be understood by one of ordinary skill in the art to encompass obvious improvements and modifications thereto.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE EMBODIMENTS

Figure 1:
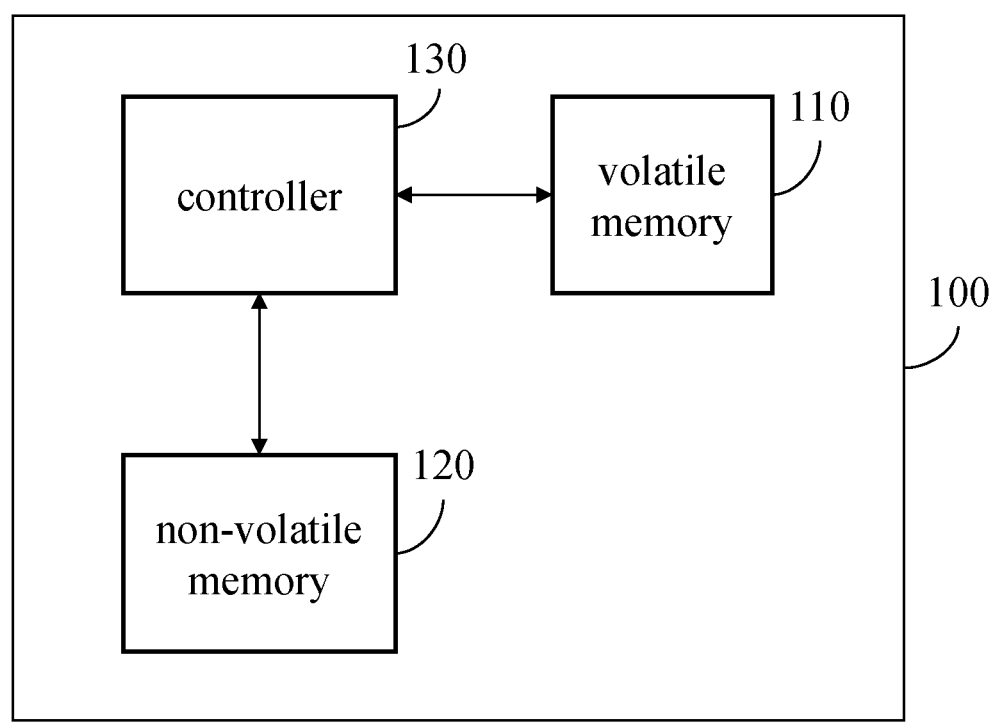
FIG. 1 is a block diagram of a storage device according to an embodiment of the present invention.

The present invention will now be described more fully hereinafter with reference to the accompanying drawings, in which exemplary embodiments of the invention are shown. This present invention may, however, be embodied in many different forms and should not be construed as limited to the embodiments set forth herein. Rather, these embodiments are provided so that this present invention will be thorough and complete, and will fully convey the scope of the present invention to those skilled in the art.

Certain terms are used throughout the description and following claims to refer to particular components. As one skilled in the art will appreciate, manufacturers may refer to a component by different names. This document does not intend to distinguish between components that differ in name but function. In the following description and in the claims, the terms "include/including" and "comprise/comprising" are used in an open-ended fashion, and thus should be interpreted as "including but not limited to".

The following description is of the best-contemplated mode of carrying out the invention. This description is made for the purpose of illustration of the general principles of the invention and should not be taken in a limiting sense. The scope of the invention is best determined by reference to the appended claims.

Moreover, the terms "include", "contain", and any variation thereof are intended to cover a non-exclusive inclusion. Therefore, a process, method, object, or device that includes a series of elements not only includes these elements, but also includes other elements not specified expressly, or may include inherent elements of the process, method, object, or device. If no more limitations are made, an element limited by "include a/an . . . " does not exclude other same elements existing in the process, the method, the article, or the device, which includes the element.

It will be understood that when a component is referred to as being "connected" or "coupled" to another component, it can be directly connected or coupled to the other component or intervening components may be present. In contrast, when a component is referred to as being "directly connected" or "directly coupled" to another component, there are no intervening components present.

It will be understood that the term "and/or" may comprise any and all combinations of one or more of the associated listed items. In addition, the singular forms "a," "an," and "the" herein are intended to comprise the plural forms as well, unless the context clearly indicates otherwise.

In the following embodiment, the same reference numerals are used to refer to the same or similar elements throughout the invention.

Please refer to FIG. 1, which is a block diagram of a storage device according to an embodiment of the present invention. As shown in FIG. 1, in the embodiment, the storage device 100 may comprise a volatile memory 110, a non-volatile memory 120, and a controller 130. The volatile memory 110 and the non-volatile memory 120 are respectively electrically connected with the controller 130 to transfer information and data.

The volatile memory 110 (e.g. RAM) reads and writes at a faster speed when in use, and the data stored in the volatile memory 110 disappears immediately after a power failure. The volatile memory 110 is configured to temporarily store data required by the controller 120 to perform access (read/write) operations. The read/write speeds of the non-volatile memory 120 are relatively slow when in use, and the data stored in the non-volatile memory 120 can be kept for a long time after the power is off. The non-volatile memory 120 (e.g. NAND Flash) comprises a plurality of blocks, each block comprises multiple physical pages, and each physical page has a separate physical address.

When the controller 130 performs a data writing (programming) operation on the non-volatile memory 120, the data writing operation are performed in units of physical pages. When the controller 130 performs a data erasing operation on the non-volatile memory 120, the data erasing operation is performed in units of blocks.

When an external host wants to write data to the storage device 100, the controller 130 may select a block from a plurality of blocks of the non-volatile memory 120 as a current block to write the data, and maintain the cached mapping table (CMT) in the volatile memory 110 for recording the correspondence between the physical address and the logical address of each physical page of the current block. When the controller 130 writes data to the last physical page of the current block, the controller 130 can store the cached mapping table in the volatile memory 110 to the non-volatile memory 120, and the logical-to-physical mapping table in the non-volatile memory 120 is updated according to the cached mapping table. The logical-to-physical mapping table is configured to record the correspondence between each logical address and physical address of the non-volatile memory 120. When the external host wants to read the data of the storage device 100, the controller 130 obtains the physical address corresponding to the data to be read by the external host through the logical-to-physical mapping table and/or the cached mapping table, and reads the data to the external host.

Figure 2:
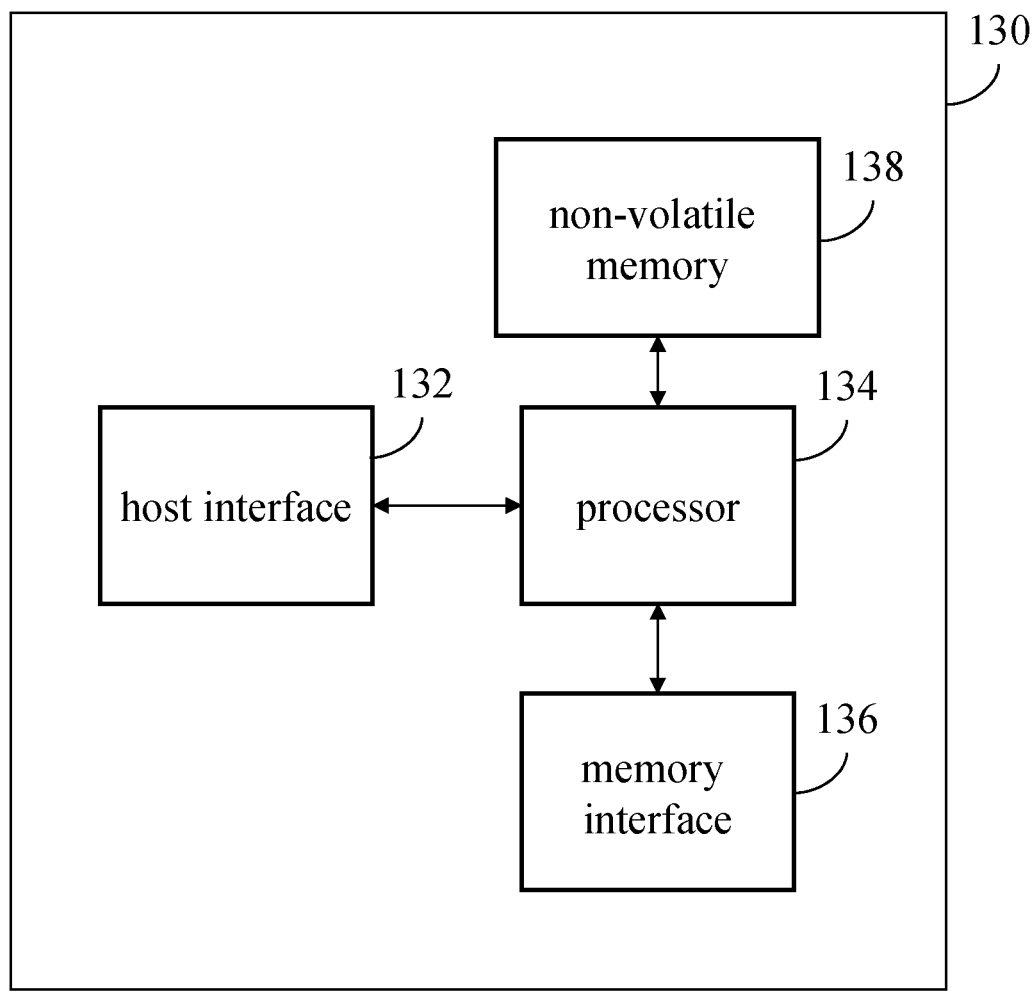
FIG. 2 is a block diagram of a controller according to an embodiment of the present invention.

Please refer to FIG. 2, which is a block diagram of a controller according to an embodiment of the present invention. In some embodiments, the controller 130 may comprise a host interface 132, a processor 134, a memory interface 136, and a non-volatile memory 138. The non-volatile memory 138 is configured to store the program codes for a method for sudden power off recovery of the storage device. For example, the non-volatile memory 138 is a read-only memory (ROM), an erasable programmable read only memory (EPROM), or an electronically erasable programmable read only memory (EEPROM). The processor 134 can be a general-purpose hardware, such as a single processor, a multi-processor with parallel processing capabilities, a graphics processor, and other processors with computing capabilities, and can complete the method for sudden power off recovery of the storage device described below when loading and executing the program codes for the method for sudden power off recovery of the storage device. The host interface 132 can be interface of a serial advanced technology attachment (SATA), a peripheral component interconnect express (PCI-E), or a universal serial bus (USB) to receive a reading command, a writing command, a erasing command, related parameters and data from the external host through the associated communication protocol, and then make them subsequently executed accordingly. The memory interface 136 is coupled to the non-volatile memory 120, and the processor 134 is coupled to the host interface 132, the memory interface 136, and the non-volatile memory 138. The processor 134 may communicate with the host through the host interface 132 and communicate with the non-volatile memory 120 through the memory interface 136. The memory interface 136 includes a plurality of registers, so that the processor 134 can adjust the physical configurations of the memory interface 136 by changing the contents of the plurality of registers.

In order to overcome the shortcomings caused by the long time consumed by the formal SPOR operation as described above, an embodiment of the present invention proposes a method for sudden power off recovery of the storage device. When the storage device 100 is in an idle state (e.g., the controller 130 is waiting for an access command of the host via the host interface 132), a first snapshot operation (e.g., a CMT backup) is performed on the storage device 100 to obtain system information of the storage device 100, and then the system information and a first tag is written to a non-volatile memory 120 (that is, the first tag is configured to record that the storage device 100 is in this idle state correspondingly). In other words, each time the storage device 100 is in the idle state, the above-mentioned first snapshot operation will be executed once. A second snapshot operation is performed on the storage device 100 to obtain system information of the storage device 100, and then the system information and a second tag is written to the non-volatile memory 120, when storage device 100 has at least one of the following situations: a logical-to-physical mapping table in the non-volatile memory 120 is updated, a garbage collection operation is executed, and a new block is programmed. In one embodiment, the first tag and the second tag are different. When the power is restarted after the power failure, the newest system information written in the non-volatile memory 120 is searched (i.e., the newest system information is the latest system information written in the non-volatile memory 120 before the power failure occurs), and it is determined whether the searched system information includes the first tag. When it is determined that the searched system information includes the first tag (that is, the power failure occurs when the storage device 100 is in the idle state), the lightweight SPOR, which is simpler than the formal SPOR, is performed. Since there is no need to parse the logic-to-physical mapping table in the non-volatile memory, nor scan the data information of all blocks in the non-volatile memory, the time required for recovering from the power failure can be greatly shortened when the storage device is in the idle state and is powered on again after the power failure.

Figure 3A:
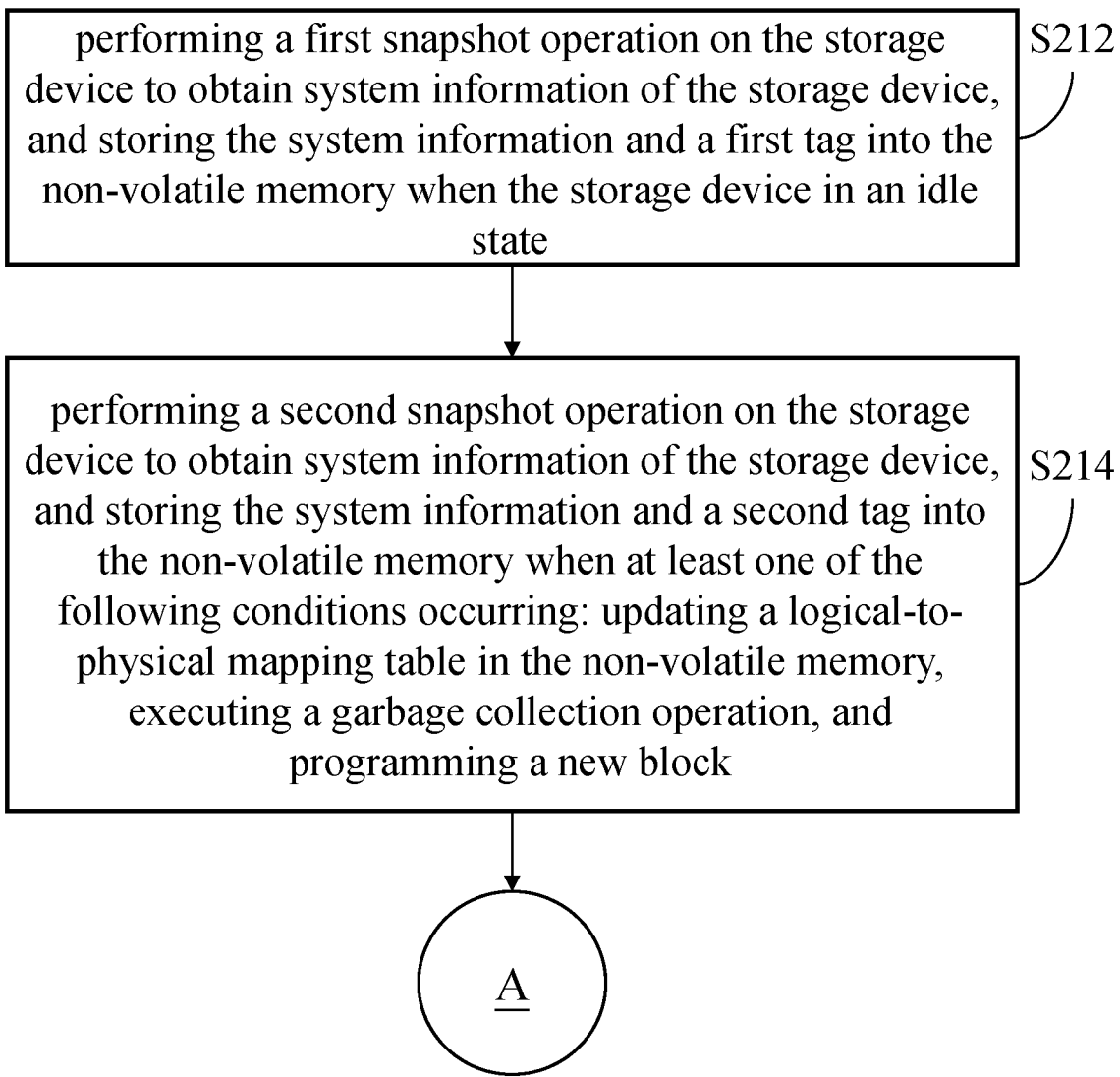
FIG. 3A and FIG. 3B is a flow chart of a recovering method for an abnormal power failure of a storage device according to an embodiment of the present invention.
Figure 3B:
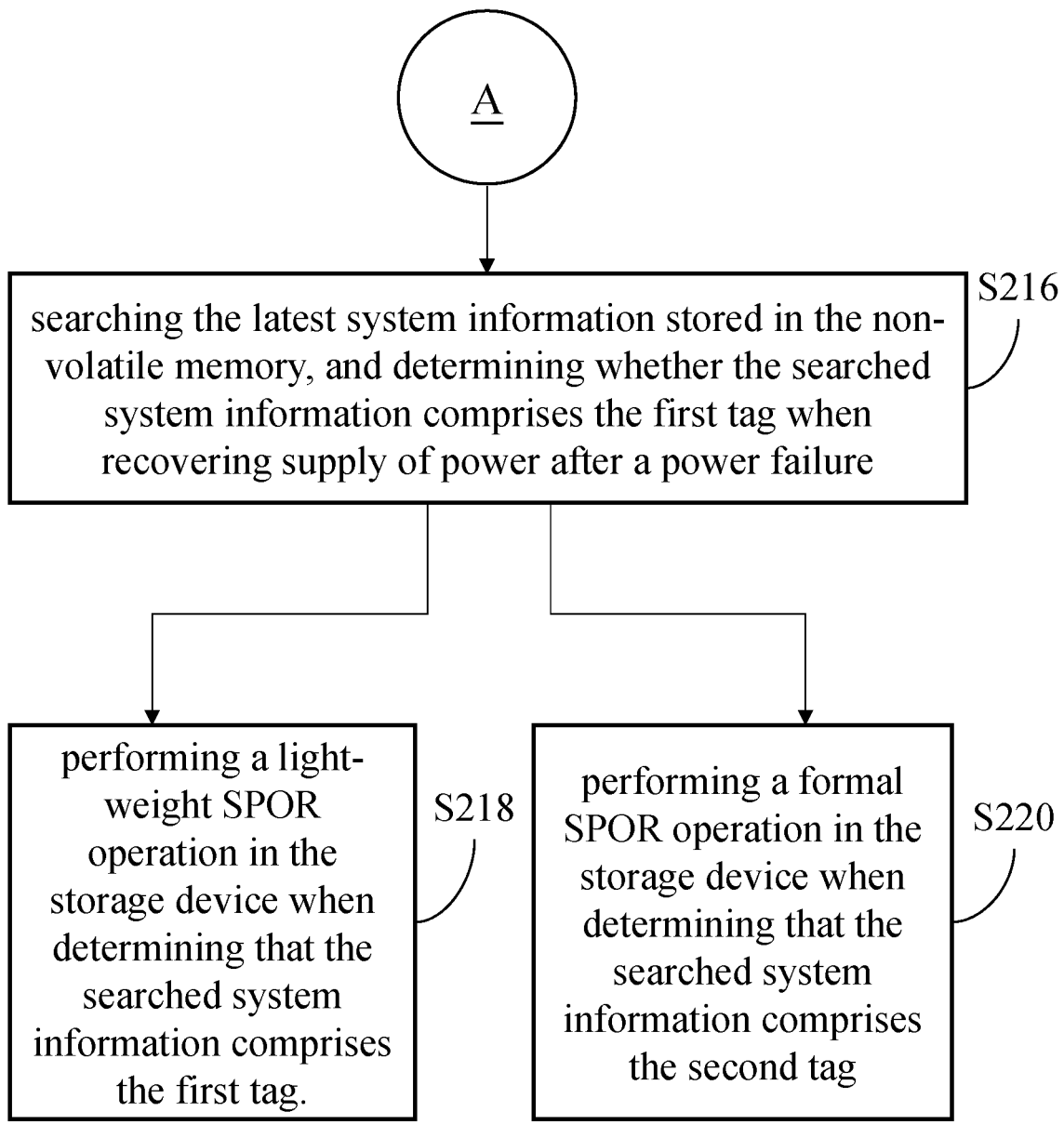

In some embodiments, the processor 134 of the controller 130 loads and executes the program codes for the method for suddenly power off the storage device to implement the method for suddenly power off the storage device 100. Refer to FIG. 3A and FIG. 3B, which is a flow chart of a method for suddenly power off a storage device according to an embodiment of the present invention. The detailed description is as follows.

Step S212: performing a first snapshot operation on the storage device 100 to obtain system information of the storage device 100, and storing the system information and a first tag into the non-volatile memory 120 when the storage device 100 in the idle state. In other words, the first tag is configured to record that the storage device 100 is currently in the idle state, and the first tag may be a tag set according to actual needs.

In one embodiment, the storing the system information and the first tag into the non-volatile memory 120 comprises: writing the first tag in the system information, and then storing the system information with the first tag into the non-volatile memory 120. That is, the system information comprises the first tag.

In one embodiment, the system information includes the cached mapping table (CMT) in the volatile memory 110, the data information of each block in the non-volatile memory 120, and the location of the block currently programmed in the non-volatile memory 120.

In an optional implementation manner, the process in which the processor 134 determines whether the storage device 100 is in the idle state comprises: continuously counting the number of input and output tasks currently to be processed by the storage device 100, and confirming whether the number of input and output tasks currently to be processed is less than a threshold; when the number of input and output tasks currently to be processed being less than the threshold for more than a preset time, determining that the storage device 100 is in the idle state, wherein the threshold and the preset time may be certain values obtained according to experimental tests or set empirically.

Step S214: performing a second snapshot operation on the storage device 100 to obtain system information of the storage device 100, and storing the system information and a second tag into the non-volatile memory 120, when at least one of the following situations occurring: updating a logical-to-physical mapping table in the non-volatile memory 120, executing a garbage collection operation (e.g., the garbage collection of the logical-to-physical mapping table in the non-volatile memory 120 and/or the garbage collection of the blocks for data storage in the non-volatile memory 120), and programming a new block. In other words, the second tag is configured to record that the logical-to-physical mapping table is updated in the non-volatile memory 120, the garbage collection operation is executed, or the new block is programmed, and the second tag may be a tag set according to actual needs. That is, the first tag and the second tag are different.

In one embodiment, the storing the system information and the second tag into the non-volatile memory 120 comprises: writing the second tag in the system information, and then storing the system information with the second tag into the non-volatile memory 120. That is, the system information comprises the second tag.

In an optional implementation manner, the processor 134 is further configured to determine whether to receive a power-off instruction from a host. When determining to receive the power-off instruction, a third snapshot operation is performed on the storage device 100 to obtain system information of the storage device 100, and store the system information and a third tag to the non-volatile memory 120. In other words, the third tag is configured to record the power-off instruction received by the storage device 100, and the system information stored with the third tag further includes a secondary table for the management of the logical-to-physical mapping table.

In one embodiment, the storing the system information and the third tag into the non-volatile memory 120 comprises: writing the third tag in the system information, and then storing the system information with the third tag into the non-volatile memory 120. That is, the system information comprises the third tag.

Step S216: searching the latest system information stored in the non-volatile memory 120, and determining whether the searched system information comprises the first tag when recovering supply of power after a power failure. In other words, the system information stored in the non-volatile memory 120 may include the second tag or the third tag, but not the first tag. Therefore, in an alternative embodiment, step S216 may further comprise: determining whether the searched system information comprises the second tag; and in another alternative embodiment, step S216 may further comprise: determining the searched system whether the searched system information comprises the third tag.

In an alternative embodiment, the first tag or the second tag written in the system information by the processor 134 may be marked in the same field of the system information, and the second tag or the third tag written in the system information by the processor 134 may be marked in another field of the system information. That is, the processor 134 can determine whether the system information includes the first tag or the second tag through the field used to mark the first tag or the second tag in the system information, and determine whether the system information includes the second tag or the third tag through the field used to mark the second tag or the third tag in the system information.

In another alternative embodiment, the first tag, the second tag, or the third tag written in the system information by the processor 134 may be marked in one field of the system information. That is, the processor 134 may determine whether the system information includes the first tag, the second tag or the third tag through the field used to mark the first tag, the second tag or the third tag in the system information.

Step S218: performing a lightweight SPOR operation when determining that the searched system information comprises the first tag.

In one embodiment, the lightweight SPOR operation comprises: acquiring and parsing data information of the currently programmed block based on data information of each block in the non-volatile memory 120 and a location of the currently programmed block in the system information; and loading a CMT in the system information into the volatile memory 110. Thus, the volatile memory 110 is restored to a state before the power failure.

In one embodiment, the searched system information comprises the CMT stored in the volatile memory 110.

Step S220: performing a formal SPOR operation when determining that the searched system information comprises the second tag.

In one embodiment, the formal SPOR operation comprises: parsing the logical-to-physical mapping table in the non-volatile memory 120, and scanning the data information of all blocks in the non-volatile memory 120 to recover the logical-to-physical mapping table in the non-volatile memory 120.

In another optional implementation manner, when it is determined that the searched system information includes the third tag, a normal power off recovery operation is performed to restore the volatile memory 110 to the state before the power-off. The normal power off recovery operation comprises: loading the logical-to-physical mapping table before the power-off to the volatile memory 110 based on the secondary table for the management of the logical-to-physical mapping table.

In summary, the disclosure provides a storage device and a method for sudden power off recovery thereof. The first snapshot operation is performed on the storage device to obtain the system information when the storage device is in the idle state, and then the system information and the first tag is written in the non-volatile memory, so that when the storage device is in the idle state and is powered on again after the power failure, if the latest system information found includes the first tag, the lightweight SPOR, which is simpler than the formal SPOR, is performed to restore the volatile memory to the state before the power failure. Therefore, there is no need to parse the logic-to-physical mapping table in the non-volatile memory, nor scan the data information of all blocks in the non-volatile memory, the time required for recovering from the abnormal power failure can be greatly shortened when the storage device is in the idle state and is powered on again after the power failure. That is, the time required to perform the lightweight SPOR operation from the power failure is significantly less than the time required to perform the formal SPOR operation. That is, a complexity of the lightweight SPOR operation is simpler than that of the formal SPOR operation.

Some or all of the aforementioned embodiments of the method of the invention may be implemented in a computer program such as an operating system for a computer, a driver for a dedicated hardware of a computer, or a software application program. Other types of programs may also be suitable, as previously explained. Since the implementation of the various embodiments of the present invention into a computer program can be achieved by the skilled person using his routine skills, such an implementation will not be discussed for reasons of brevity. The computer program implementing some or more embodiments of the method of the present invention may be stored on a suitable computer-readable data carrier such as a DVD, CD-ROM, USB stick, a hard disk, which may be located in a network server accessible via a network such as the Internet, or any other suitable carrier.

Although the embodiments have been described as having specific elements in the figures, it should be noted that additional elements may be included to achieve better performance without departing from the spirit of the invention. In addition, although the flow chart described includes a number of operations that appear to occur in a specific order, it should be noted that those skilled in the art can modify the order of these steps on the premise of achieving the same effect without departing from the spirit of the invention. Therefore, the present invention is not limited to using only the order described above. Furthermore, those skilled in the art can also integrate several steps into one step, or perform more steps sequentially or in parallel in addition to these steps, and the present invention is not limited thereby.

Although the present invention has been explained in relation to its preferred embodiment, it does not intend to limit the present invention. It will be apparent to those skilled in the art having regard to this present invention that other modifications of the exemplary embodiments beyond those embodiments specifically described here may be made without departing from the spirit of the invention. Accordingly, such modifications are considered within the scope of the invention as limited solely by the appended claims.

What is claimed is:

1. A method for sudden power off recovery of a storage device comprising a volatile memory, a non-volatile memory, and a controller, the method comprising:
performing a first snapshot operation on the storage device to obtain system information of the storage device, and storing the system information and a first tag into the non-volatile memory when the storage device in an idle state;
performing a second snapshot operation on the storage device to obtain system information of the storage device, and storing the system information and a second tag into the non-volatile memory when at least one of the following conditions occurs: updating a logical-to-physical mapping table in the non-volatile memory, executing a garbage collection operation, and programming a new block;
searching the latest system information stored in the non-volatile memory, and determining whether the searched system information comprises the first tag or the second tag when recovering supply of power after a power failure;
performing a lightweight sudden power off recovery (SPOR) operation in the storage device when determining that the searched system information comprises the first tag; and
performing a formal sudden power off recovery (SPOR) operation in the storage device when determining that the searched system information comprises the second tag;
wherein the first tag and the second tag are different.

2. The method according to claim 1, wherein the formal SPOR operation comprises: parsing the logical-to-physical mapping table in the non-volatile memory, and scanning data information of all blocks in the non-volatile memory based on the searched system information to recover the logical-to-physical mapping table in the non-volatile memory.

3. The method according to claim 2, wherein the system information comprises: a cached mapping table (CMT) in the volatile memory, the data information of each block in the non-volatile memory, and the location of the currently programmed block in the non-volatile memory.

4. The method according to claim 1, wherein the lightweight SPOR operation comprises: acquiring and parsing data information of the currently programmed block based on data information of each block in the non-volatile memory and a location of the currently programmed block in the searched system information; and loading a cached mapping table (CMT) in the searched system information into the volatile memory.

5. The method according to claim 4, wherein the searched system information comprises the CMT stored in the volatile memory.

6. The method according to claim 1, further comprising:
when determining to receive a power-off instruction from a host, performing a third snapshot operation on the storage device to obtain system information of the storage device, and storing the system information and a third tag into the non-volatile memory.

7. The method according to claim 1, wherein the garbage collection operation further comprises:
performing garbage collection of the logical-to-physical mapping table in the non-volatile memory.

8. The recovering method according to claim 1, wherein the garbage collection operation further comprises:
performing garbage collection of the blocks for data storage in the non-volatile memory.

9. The recovering method according to claim 1, wherein a time required to perform the lightweight SPOR operation is less than the time required to perform the formal SPOR operation.

10. A storage device comprising a volatile memory, a non-volatile memory, and a controller, the controller coupled to the volatile memory and the non-volatile memory, the controller comprises:
a processor, configured to execute a program code for a method for sudden power off recovery of the storage device to:
perform a first snapshot operation on the storage device to obtain system information of the storage device, and write the system information and a first tag to the non-volatile memory when the storage device is in an idle state;
perform a second snapshot operation on the storage device to obtain system information of the storage device, and write the system information and a second tag to the non-volatile memory, when it is determined that at least one of the following situations occurs: a logical-to-physical mapping table is updated in the non-volatile memory, a garbage collection operation is executed, and a new block is programmed;
search the latest system information written in the non-volatile memory, and determine whether the searched system information comprises the first tag or the second tag when supply of power is recovered after a power failure;
perform a lightweight SPOR operation in the storage device when the searched system information comprises the first tag; and
perform a formal sudden power off recovery (SPOR) operation in the storage device when the searched system information comprises the second tag;
wherein the first tag and the second tag are different.

11. The storage device according to claim 10, wherein the formal SPOR operation comprises: parsing the logical-to-physical mapping table in the non-volatile memory, and scanning data information of all blocks in the non-volatile memory based on the searched system information to recover the logical-to-physical mapping table in the non-volatile memory.

12. The storage device according to claim 11, wherein the system information comprises: a cached mapping table (CMT) in the volatile memory, the data information of each block in the non-volatile memory, and the location of the currently programmed block in the non-volatile memory.

13. The storage device according to claim 10, wherein the lightweight SPOR operation comprises: acquiring and parsing data information of the currently programmed block based on data information of each block in the non-volatile memory and a location of the currently programmed block in the searched system information; and loading a cached mapping table (CMT) in the searched system information into the volatile memory.

14. The storage device according to claim 13, wherein the searched system information comprises the CMT stored in the volatile memory.

15. The storage device according to claim 10, wherein the processor is configured to perform a third snapshot operation on the storage device to obtain system information of the storage device, and write the system information and a third tag into the non-volatile memory, when the processor receives a power-off instruction from a host.

16. The storage device according to claim 10, wherein the garbage collection operation further comprises:
   performing garbage collection of the logical-to-physical mapping table in the non-volatile memory.

17. The storage device according to claim 10, wherein the garbage collection operation further comprises:
   performing garbage collection of the blocks for data storage in the non-volatile memory.

18. The storage device according to claim 10, wherein a time required to perform the lightweight SPOR operation is less than the time required to perform the formal SPOR operation.

\* \* \* \* \*